US011827355B2

(12) United States Patent
Page

(10) Patent No.: US 11,827,355 B2
(45) Date of Patent: Nov. 28, 2023

(54) ELEVON DESIGN FOR ALL-AXIS CONTROL IN A BLENDED WING BODY AIRCRAFT

(71) Applicant: JETZERO, INC., Orange, CA (US)

(72) Inventor: Mark A. Page, Orange, CA (US)

(73) Assignee: JETZERO, INC., Orange, CA (US)

( * ) Notice: Subject to any disclaimer, the term of this patent is extended or adjusted under 35 U.S.C. 154(b) by 0 days.

(21) Appl. No.: 17/873,679

(22) Filed: Jul. 26, 2022

(65) Prior Publication Data

US 2022/0371720 A1      Nov. 24, 2022

Related U.S. Application Data

(63) Continuation of application No. 16/730,707, filed on Dec. 30, 2019, now Pat. No. 11,420,725.

(60) Provisional application No. 62/786,610, filed on Dec. 31, 2018.

(51) Int. Cl.
  *B64C 9/02*    (2006.01)
  *B64C 39/10*   (2006.01)
  *B64C 39/00*   (2023.01)
(52) U.S. Cl.
  CPC .............. *B64C 9/02* (2013.01); *B64C 39/10* (2013.01); *B64C 2039/105* (2013.01)

(58) Field of Classification Search
  CPC .... B64C 9/12; B64C 9/16; B64C 9/18; B64C 5/10; B64C 3/50; B64C 9/02; B64C 39/10; B64C 2039/105
  See application file for complete search history.

(56) References Cited

U.S. PATENT DOCUMENTS

| | | | | |
|---|---|---|---|---|
| 5,150,858 A * | 9/1992 | Hopwell | | B64C 5/10 |
| | | | | 244/3.25 |
| 8,292,220 B1 * | 10/2012 | Westra | | B64C 3/141 |
| | | | | 244/137.1 |
| 8,613,409 B2 * | 12/2013 | Cazals | | B64C 9/16 |
| | | | | 244/90 R |
| 2003/0197097 A1 * | 10/2003 | Wakayama | | B64C 3/10 |
| | | | | 244/215 |
| 2019/0118932 A1 * | 4/2019 | Princen | | B64C 9/00 |
| 2020/0156766 A1 * | 5/2020 | Tzabari | | B64C 9/02 |

FOREIGN PATENT DOCUMENTS

DE    102006036389 A1 *   2/2008   ........... B64C 27/615

\* cited by examiner

*Primary Examiner* — Tien Q Dinh
*Assistant Examiner* — William L Gmoser
(74) *Attorney, Agent, or Firm* — CALDWELL INTELLECTUAL PROPERTY LAW

(57) ABSTRACT

Aspects relate to airplanes having a blended wing body. A blended wing body may include a fuselage and a port wing and a starboard wing continuously coupled to the fuselage and a nose section. A midship control surface may be disposed on a trailing edge of the blended wing body and centered between the port wing and the starboard wing.

20 Claims, 8 Drawing Sheets

ELEVON DESIGN FOR ALL-AXIS CONTROL IN A BLENDED WING BODY AIRCRAFT

CROSS REFERENCE TO RELATED APPLICATIONS

This continuation claims priority to U.S. patent application Ser. No. 16/730,707 filed on Dec. 30, 2019, which claims the benefit of U.S. Provisional Application No. 62/786,610 filed Dec. 31, 2018, both of which are incorporated herein by reference in their entirety.

FIELD OF THE INVENTION

The present invention generally relates to the field of blended wing body aircrafts. In particular, the present invention is directed to elevon design for all-axis control in a blended wing body aircraft.

BACKGROUND

Blended wing body aircraft exhibit a number of fuel and noise saving advantages. Reduced fuel consumption or fuel from renewable sources is increasingly important as the effects of global warming are becoming better understood. However, the aerodynamic properties of blended wing aircraft which facilitate these advances in fuel savings, when practically applied can complicate the aerodynamic control of the aircraft.

SUMMARY OF THE DISCLOSURE

These and other aspects and features of non-limiting embodiments of the present invention will become apparent to those skilled in the art upon review of the following description of specific non-limiting embodiments of the invention in conjunction with the accompanying drawings.

In an aspect, an exemplary airplane includes a blended wing body, wherein the blended wing body includes a fuselage and a port wing and a starboard wing continuously coupled to the fuselage and a nose section, and a midship control surface disposed on a trailing edge of the blended wing body and centered between the port wing and the starboard wing.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Conventional aircraft consist essentially of a wing section and a fuselage. This so-called "tube and wing" configuration enables convenient packaging of passengers and cargo, but has certain drawbacks. In most cases, passengers are seated on a deck disposed approximately on the vertical centerline of the fuselage, while cargo is stowed beneath. This enables a relatively wide, flat floor for seats and separates cargo operations from passenger loading and unloading. Passengers can be loaded via one or more passenger doors, while cargo can be loaded from one or more cargo hatches on the underside or sides of the fuselage. This configuration also provides a relative constant fuselage cross section (less the nose and tail cones), enabling a substantially percentage of the available volume of the fuselage to be utilized.

In conventional aircraft, such as a tube and wing configuration, a combination of elevators and ailerons may be used to provide various controls to the aircraft. For a tube and wing configured, elevators may provide pitch control of the aircraft, while the ailerons (usually used as pairs on opposite wings) are used to control the roll (or movement about a longitudinal axis) of the aircraft. Some aircraft employ the use of split-drag-rudder type of ailerons, whereby the upper and lower surfaces of the ailerons move in opposite directions to increase the drag of the aircraft.

In a blended wing body ("BWB") aircraft, the functions of the elevator and aileron may be combined into one control surface at the trailing edge of the BWB aircraft called an elevon. In a BWB configuration, both the fuselage and the wing provide lift. As the name implies, the blended wing blends the wing and fuselage together to provide a single, lift-producing body. In this configuration, the fuselage serves to both carry passengers and/or cargo and to provide a significant portion of the lift. As a result, the wing portion can be smaller for a given payload. Thus, blended wing aircraft tend to have significantly lower overall drag and can carry larger payloads while consuming less fuel.

Figure 1A:
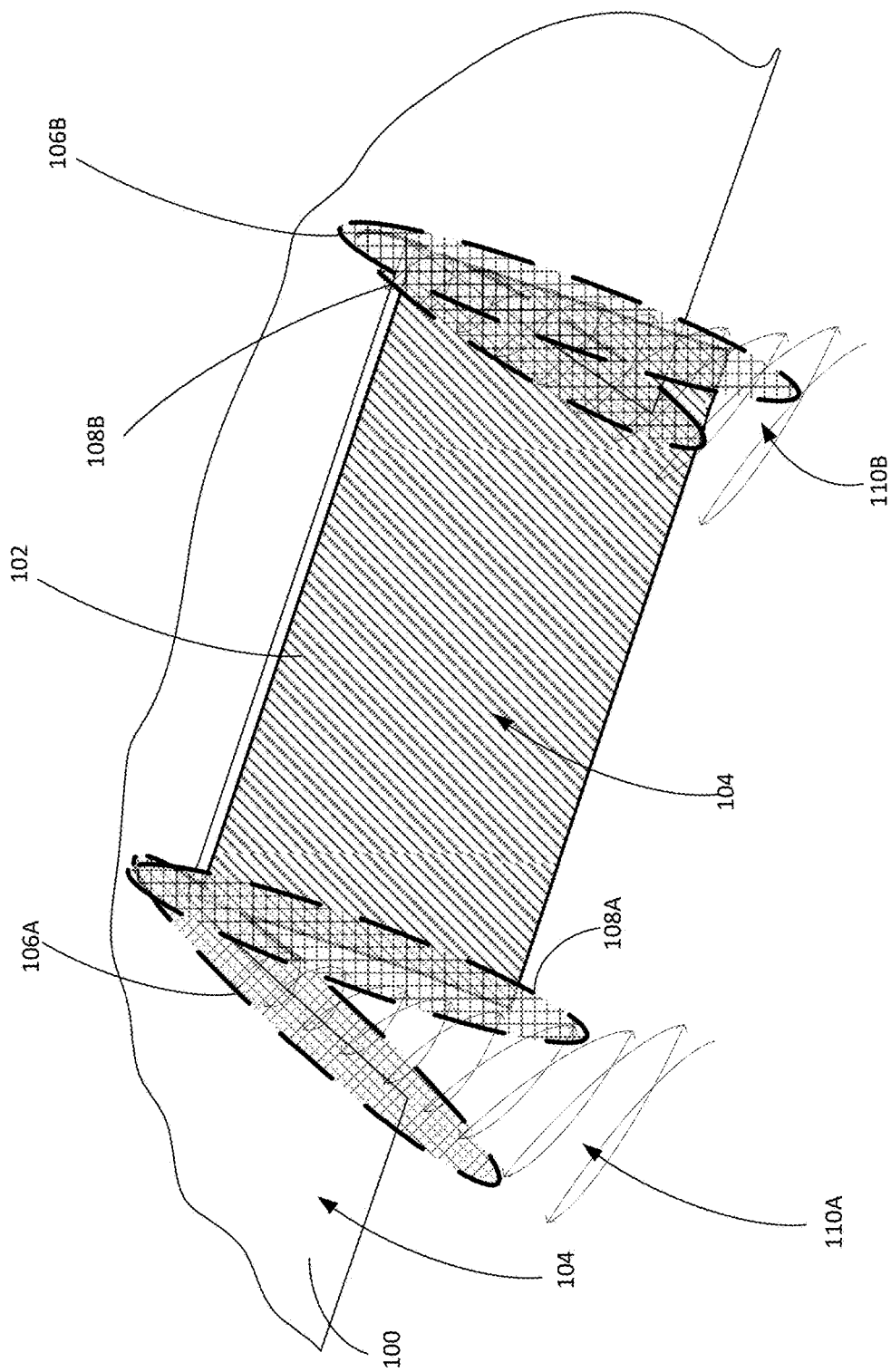
FIGS. 1A and 1B illustrate vortex drag created in conventional control surface use.
Figure 1B:
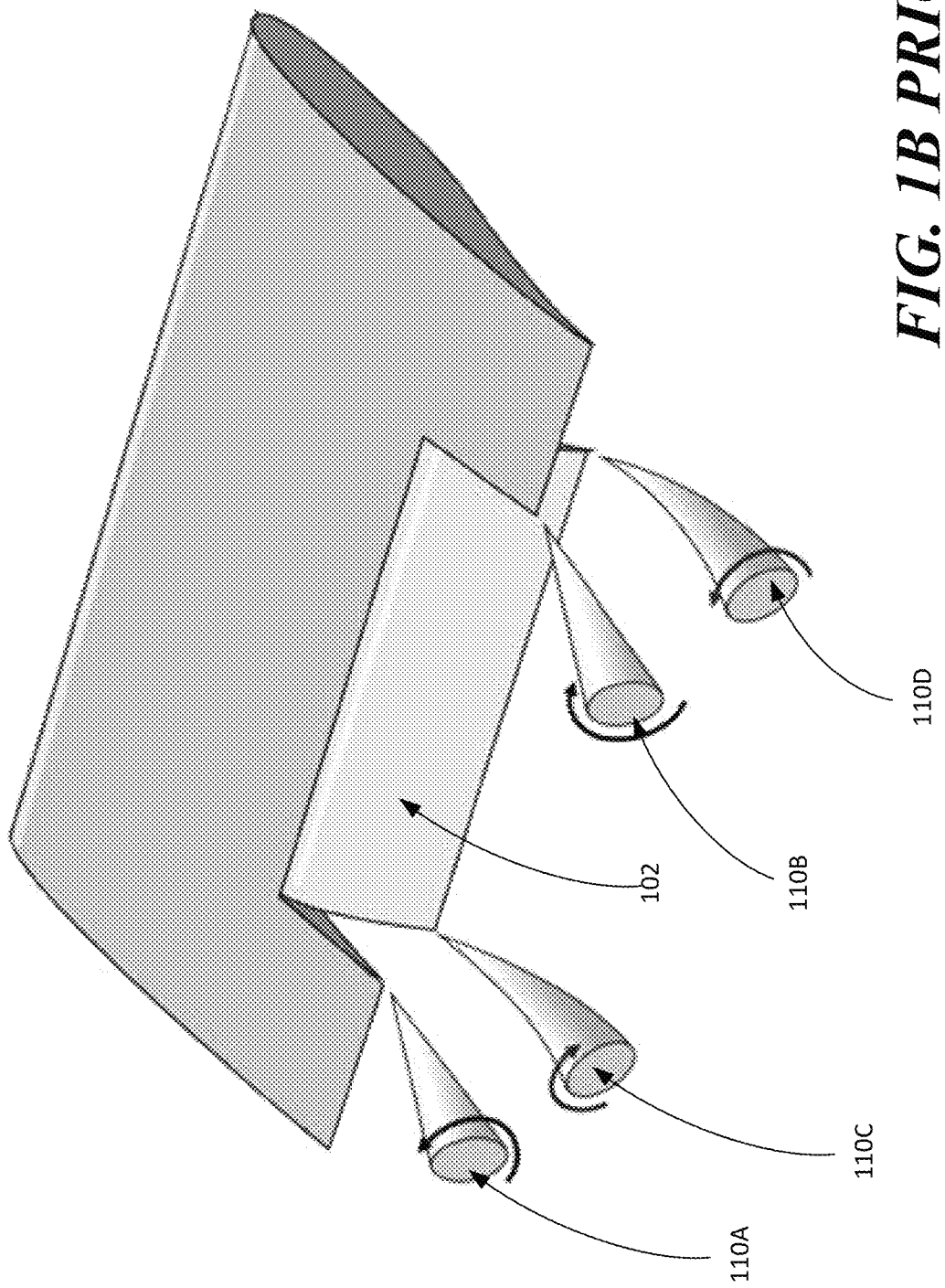

An issue with conventional elevator and aileron control surfaces is the drag created when using the surfaces for pitch (elevator) or roll (ailerons). One major source of drag is a gap between the control surface and the edge of the adjacent wing when the control surface is being used. FIG. 1 illustrates the creation of vortex drag in conventional control surface use. Illustrated in FIG. 1 is a partial view of a wing 100 and control surface 102. The control surface 102 may be an elevator, aileron, or elevon depending on the particular type of aircraft to which the control surface 102 is installed and used. The control surface 102 illustrated in FIG. 1 is in a downward configuration, whereby a top layer 104 of the control surface 102 is below a bottom layer 106 of the wing 100. When in the downward configuration, a gap forms between a wing edge 106A proximate to a control surface edge 108A. A gap also forms between a wing edge 106B proximate to a control surface edge 108B. While the gaps may cause various airflows, the gaps illustrated in FIG. 1 cause vortex airflows 110A and 110B, which cause drag on the aircraft. FIG. 1B further illustrate vortex drag. In FIG. 1B, the control surface 102 is in a downward position, creating vortexes 110A-110D, which are relatively large compared to the size of the control surface 102. Thus, a relatively large amount of drag is created in these conventional control surfaces.

It is with these and other considerations that the presently disclosed subject matter is described.

In a BWB aircraft, a unified control scheme is described herein. The unified control scheme uses angular control surfaces. The angular control surfaces are designed to reduce the formation of vortex airflows when the control surfaces are in the upward or downward (in-use) positions.

Examples of the present disclosure related generally to providing a unified control scheme that uses angular control surfaces in a BWB aircraft. In some examples of the presently disclosed subject matter, one or more control surfaces used to control the aircraft (e.g. roll, pitch, and the like). The control surfaces use obtuse angle planforms to reduce the creation of drag on the aircraft when the control surfaces are being used. Further, in some examples, groups of control surfaces can be used together to provide for pitch control, roll control, asymmetric drag control for yaw. In some examples, the angular control surfaces, when used, do not create an exposed edge gap.

Figure 2:
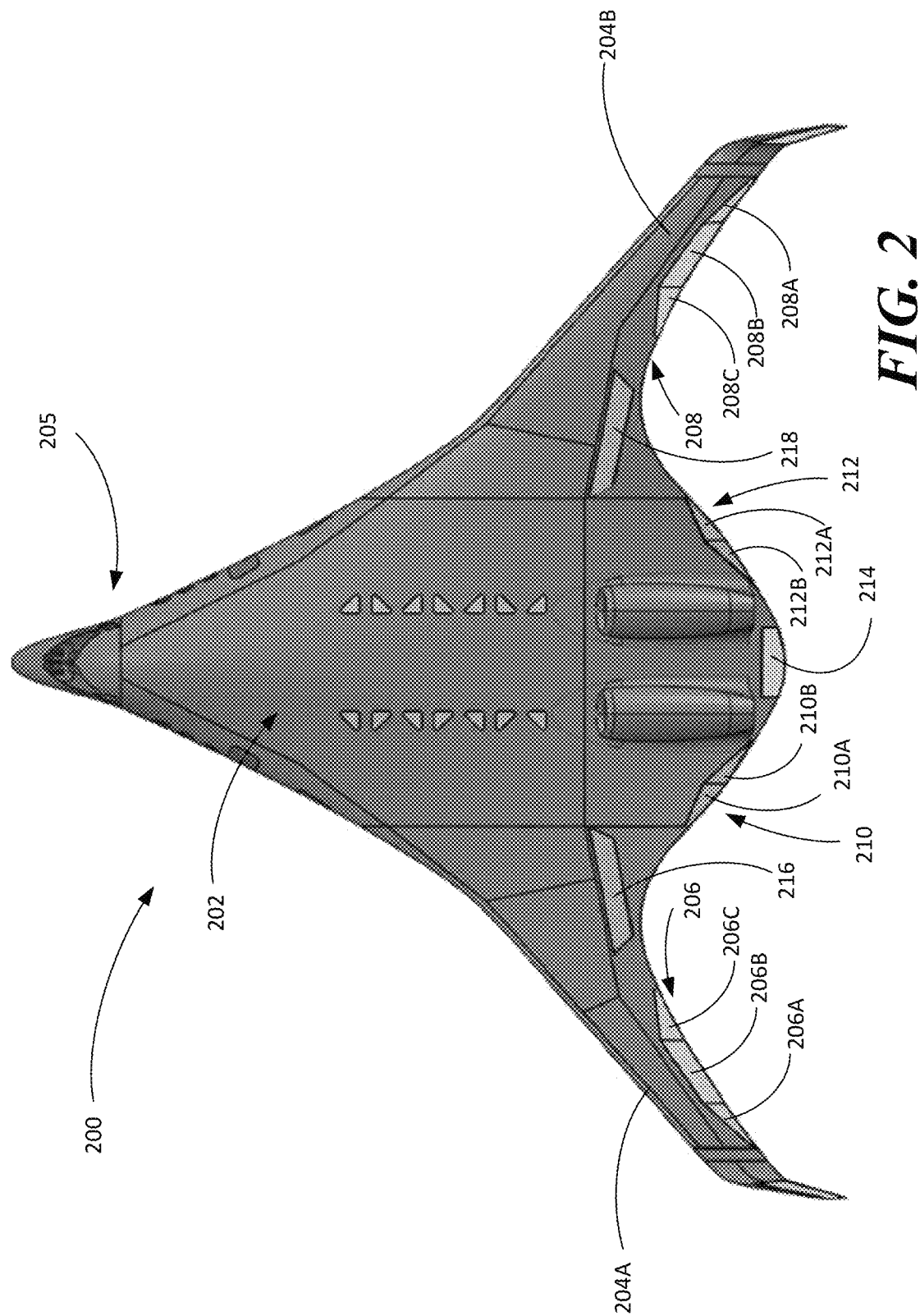
FIG. 2 is top-down view of a BWB aircraft with angular control surfaces, according to some examples disclosed herein.

FIG. 2 is a top-down view illustration of a BWB aircraft 200, according to some examples disclosed herein. As illustrated in FIG. 2, the BWB aircraft 200 includes a fuselage 202. The fuselage 202 includes a port wing 204A and a starboard wing 204B that are continuously coupled to a nose section 205 of the BWB aircraft 200. The fuselage 202 and wings 204A and 204B are each illustrated to have positive sweep angles. The BWB aircraft 200 of FIG. 2 is a single deck BWB aircraft configuration, though various examples of the presently disclosed subject matter can be used with different BWB aircraft having more than one deck.

The BWB aircraft 200 includes multiple, movable control surfaces that allow a pilot to control the BWB aircraft 200. The BWB aircraft 200 of FIG. 2 includes multiple sets of control surfaces having obtuse angle planforms (illustrated in more detail in FIG. 3). As noted above with respect to conventional aircraft, control surfaces when used often create vortex drag due to the angle and space between the edge of the control surface and the aircraft's fuselage.

The BWB aircraft 200, to minimize the creation of drag such as vortex drag, includes port outer control surface triplet 206. The port outer control surface triplet 206 comprises individually controllable control surfaces 206A, 206B, and 206C. In a similar manner, the BWB aircraft 200 includes starboard outer control surface triplet 208. The starboard outer control surface triplet 208 comprises individually controllable control surfaces 208A, 208B, and 208C. The BWB aircraft 200 further includes port inner control surface doublet 210. The port inner control surface doublet 210 comprises individually controllable control surfaces 210A and 210B. The BWB aircraft 200 further includes starboard inner control surface doublet 212. The starboard inner control surface doublet 212 comprises individually controllable control surfaces 212A and 212B. The BWB aircraft 200 may further include a midship control surface 214, which may be used for, among other uses, air braking, and port control surface 216 and starboard control surface 218.

The port outer control surface triplet 206, the starboard outer control surface triplet 208, the port inner control surface doublet 210, the starboard inner control surface doublet 212, the midship control surface 214, the port control surface 216, and the starboard control surface 218 may be collectively or individually to provide control surfaces such as ailerons, elevators, elevons, flaps, brakes, and rudders. The port outer control surface triplet 206, the starboard outer control surface triplet 208, the port inner control surface doublet 210, the starboard inner control surface doublet 212, the midship control surface 214, the port control surface 216, and the starboard control surface 218 may be movable in an upward direction, a downward direction, or a split configuration. In a split configuration, a top surface of the particular control surface moves upward and a bottom surface of the same control surface moves downward. Further, as mentioned above, each of the control surfaces comprising the port outer control surface triplet 206, the starboard outer control surface triplet 208, the port inner control surface doublet 210, the starboard inner control surface doublet 212, the midship control surface 214, the port control surface 216, and the starboard control surface 218 may be moved individually or with other control surfaces.

Figure 3:
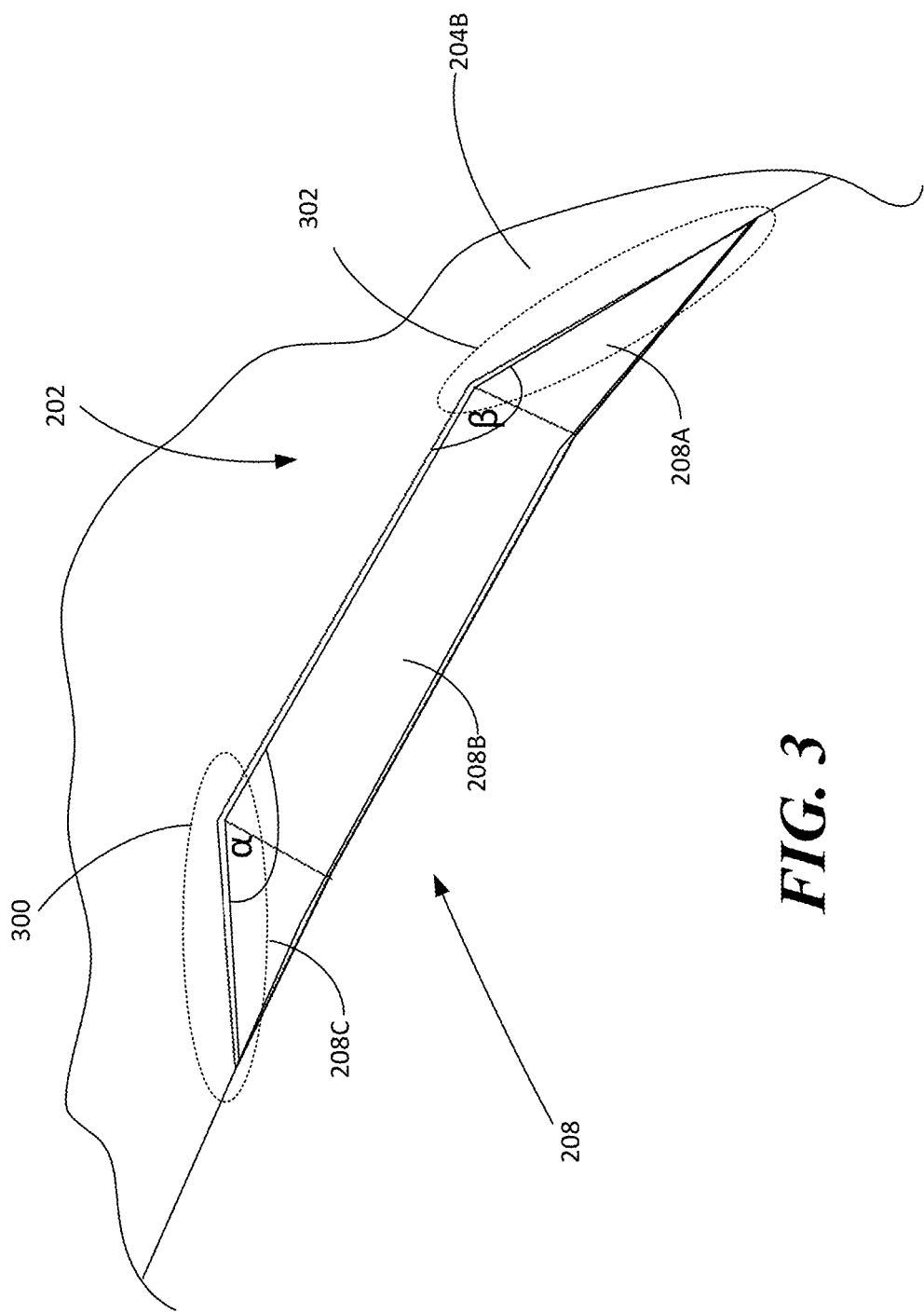
FIG. 3 is a top-down illustration of a set of angular control surfaces, according to some examples disclosed herein.

As mentioned previously, to reduce the creation of vortex drag and other types of drag when used, one or more of the control surfaces may have obtuse angle planforms. FIG. 3 is an illustration of the starboard outer control surface triplet 208 showing an obtuse angle planform. As illustrated in FIG. 3, the starboard outer control surface triplet 208 includes the individually controllable control surfaces 208A, 208B, and 208C installed on the starboard wing 204B of the fuselage 202.

As shown in FIG. 1, when a control surface is moved from a neutral or middle position, the interface between the edge of the control surface and the wing (or another control surface) can create vortex drag. To minimize the effect, an edge interface 300 is created by the control surfaces 208C, 208B, and the wing 204B having a triangular shape and having an interface angle of α. In a similar manner, an edge interface 302 is created by the control surfaces 208B, 208A, and the wing 204B having a triangular shape and having an interface angle of β. The interface angle α and the interface angle β allow for a smoother transition of air when the control surfaces are in an upward or downward position, illustrated in more detail in FIG. 4A. In some examples, the interface angle α and/or the interface angle β may range from 20 degrees to less than 90 degrees, and in some configurations, range from 30 degrees to 60 degrees. It should be understood that the interface angle α and/or the interface angle β may be angles fewer than 20 degrees. It should be noted that the edge interface may also be applied to doublet or singlet configurations, such as the port inner control surface doublet 210, the starboard inner control surface doublet 212, the midship control surface 214, the port control surface 216, and the starboard control surface 218.

Figure 4A:
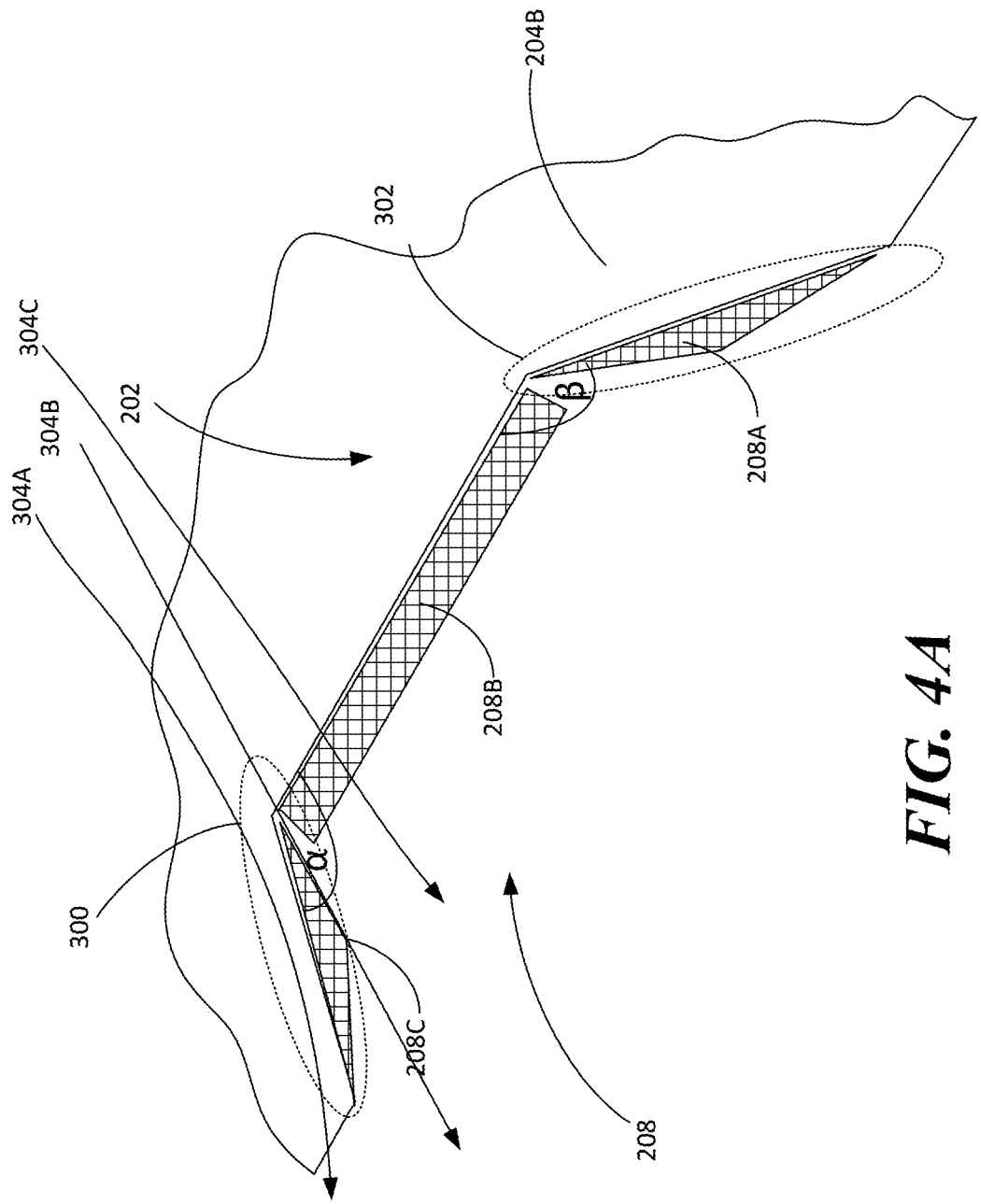
FIG. 4A is a top-down illustration of a set of angular surfaces in an upward configuration, according to some examples disclosed herein.

FIG. 4A is an illustration of the starboard outer control surface triplet 208 showing an obtuse angle planform with individual control surfaces in an upward configuration. As illustrated in FIG. 4A, the individually controllable control surfaces 208A, 208B, and 208C installed on the starboard wing 204B of the fuselage 202 are in an upward (or rotated above the wing) configuration. The rotation may be done using conventional control systems such as hydraulics, pneumatics, electrical, and other types of control systems used to move control surfaces on conventional aircraft.

As illustrated in FIG. 4A, the edge interface 300 created by the control surfaces 208C, 208B, and the wing 204B when the control surfaces 208C and 208B are upwards is not appreciably different than as illustrated in FIG. 3 when the control surfaces 208C and 208B are in a neutral position. Similarly, as illustrated in FIG. 4A, the edge interface 302 created by the control surfaces 208B, 208A, and the wing 204B when the control surfaces 208B and 208A are upwards is not appreciably different than as illustrated in FIG. 3 when the control surfaces 208B and 208A are in a neutral position. Because the edge interfaces 300 and 302 are similar when the control surfaces are in an upward, downward, or neutral configuration, the amount of drag created when used may be minimized. This is generally illustrated by airflows 304A, 304B, and 304C moving over the surfaces, as opposed to the airflows illustrated in FIG. 1.

Figure 4B:
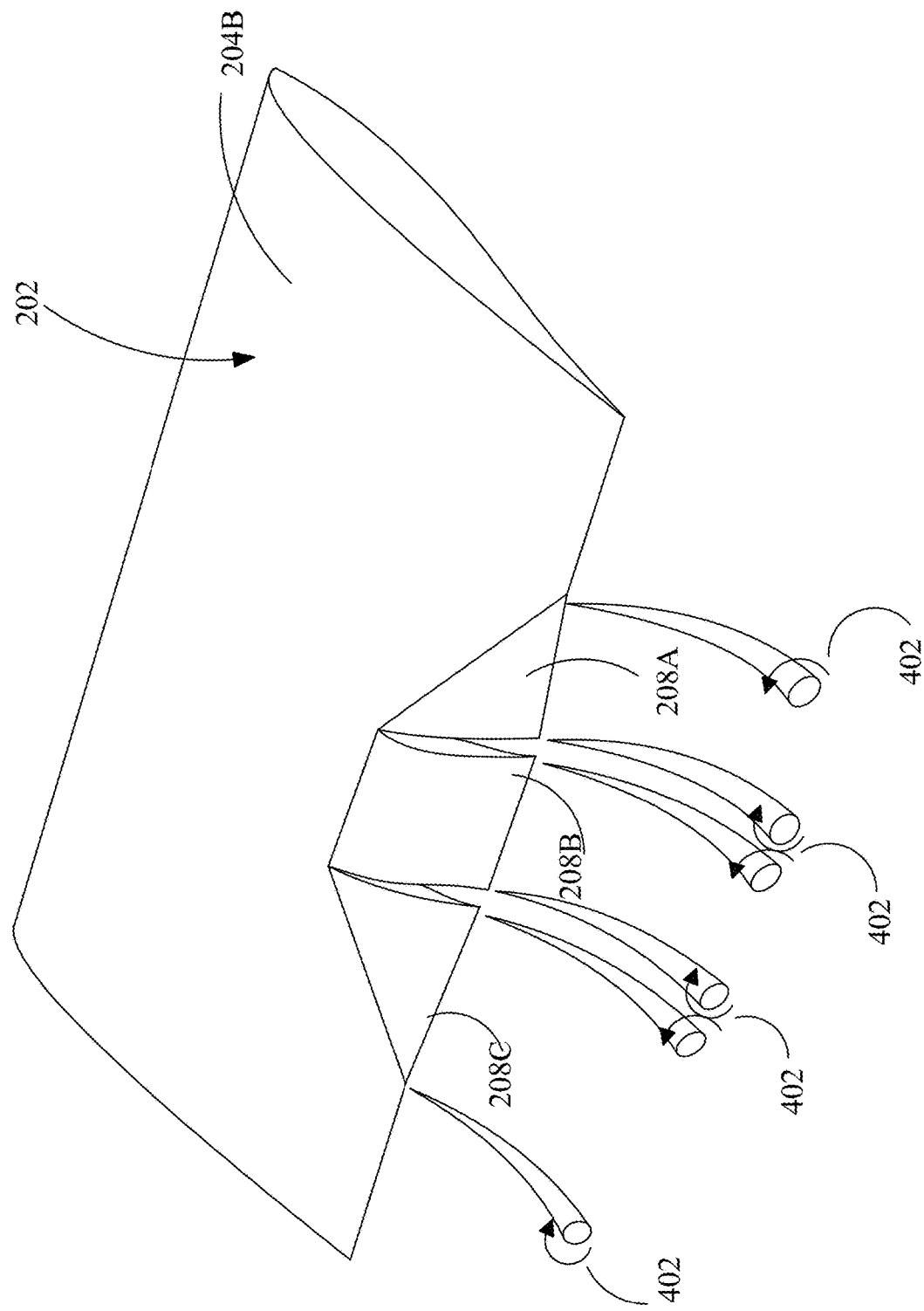
FIG. 4B are a top-down illustration of a set of angular surfaces in a downward configuration, according to some examples disclosed herein.

FIG. 4B is an illustration of the starboard outer control surface triplet 208 showing an obtuse angle planform with individual control surfaces in a downward configuration to further illustrate vortexes. In FIG. 4B, the individually controllable control surfaces 208A, 208B, and 208C installed on the starboard wing 204B of the fuselage 202 are in a downward (or rotated below the starboard wing 204B) configuration. Vortexes 402 are illustrated. As illustrated, the size of the vortexes 402 are relatively smaller than the vortexes 110A-110D illustrated in FIGS. 1A and 1B. Thus, using obtuse angle planforms, the size of the vortexes can be reduced, reducing the drag on the aircraft while providing similar or the same performance characteristics.

Figure 5A:
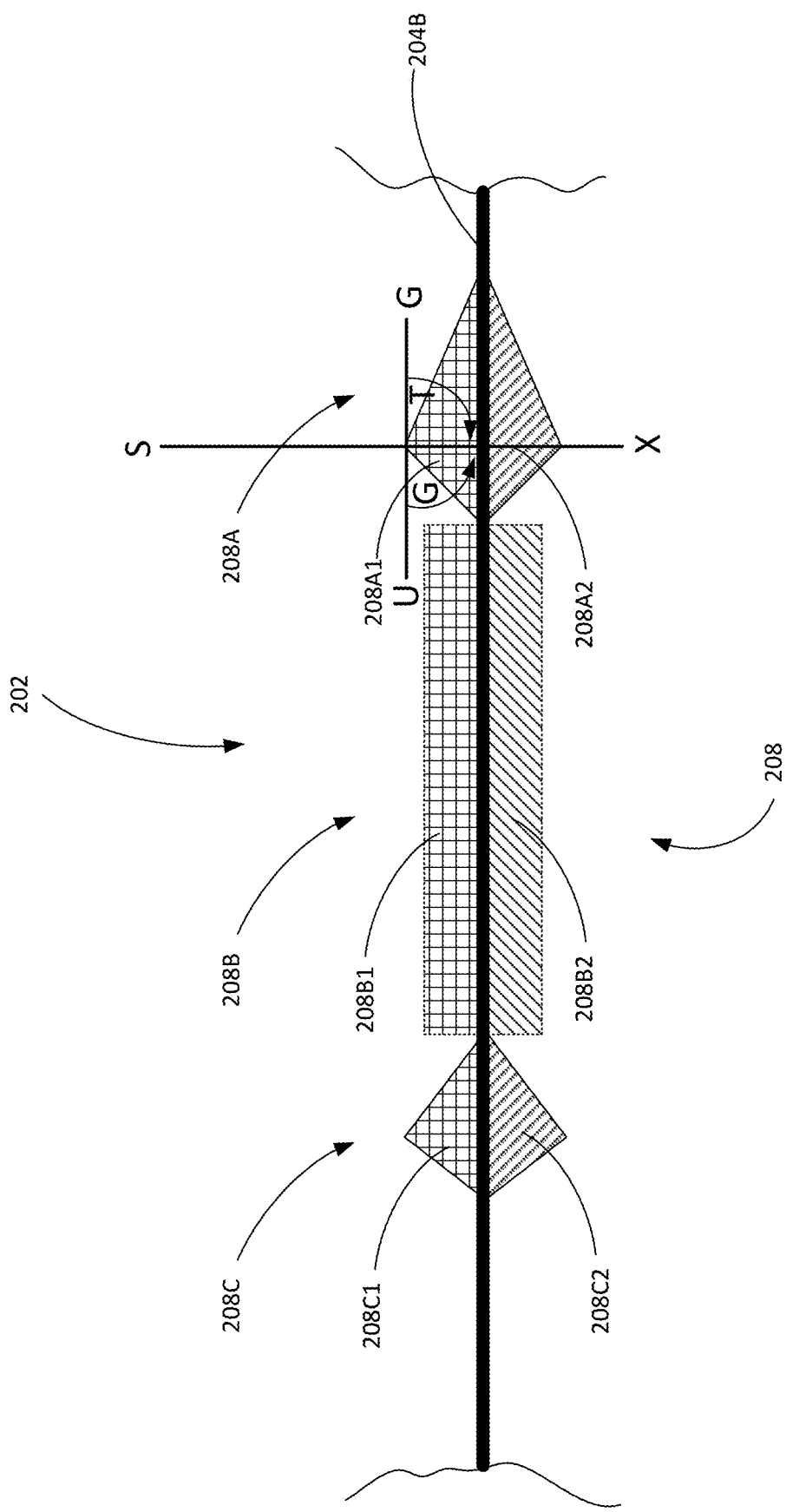
FIG. 5A is a rear-view illustration of a set of angular surfaces in a split configuration, according to some examples disclosed herein.

FIG. 5A is a rear-view illustration of a set of angular surfaces in a split configuration, according to some examples disclosed herein. Illustrated in FIG. 5A is the starboard outer control surface triplet 208 having the individually controllable control surfaces 208A, 208B, and 208C installed on the starboard wing 204B of the fuselage 202. In some examples, one or more of the control surfaces may be used to slow the airplane or to retard the flow of air at a particular location. In this example, the individually controllable control surfaces 208A, 208B, and 208C, by way of example, may have an upper and lower surface than can be raised and lowered at the same time.

As illustrated, the individually controllable control surface 208A includes upper control surface 208A1 and lower control surface 208A2. As illustrated, the individually controllable control surface 208B includes upper control surface 208B1 and lower control surface 208B2. As illustrated, the individually controllable control surface 208C includes upper control surface 208C1 and lower control surface 208C2. The upper and lower control surfaces may be controlled individually or may be moved upwards or downwards as a unit.

The various control surfaces may have various degrees. For example, the upper control surface 208A1 may be constructed such that inner interface angle G, the surface proximate to the upper control surface 208B1 as measured from the intersection of lines UG and SX, is in the range of 1 degree to 89 degrees, and in some examples, in the range of 20 degrees to 70 degrees, and in still further examples, in the range of 40 degrees to 60 degrees. For the purposes of providing an example only, the upper control surface 208A1 inner interface angle G is illustrated as 45 degrees. In a similar manner, the upper control surface 208A1 may be constructed such that outer interface angle T, the surface distal to the upper control surface 208B1 as measured from the intersection of lines UG and SX, is in the range of 1 degree to 89 degrees, and in some examples, in the range of 20 degrees to 70 degrees, and in still further examples, in the range of 40 degrees to 60 degrees. For the purposes of providing an example only, the upper control surface 208A1 outer interface angle T is illustrated as 30 degrees. Other control surfaces may be similarly constructed with various angles.

Figure 5B:
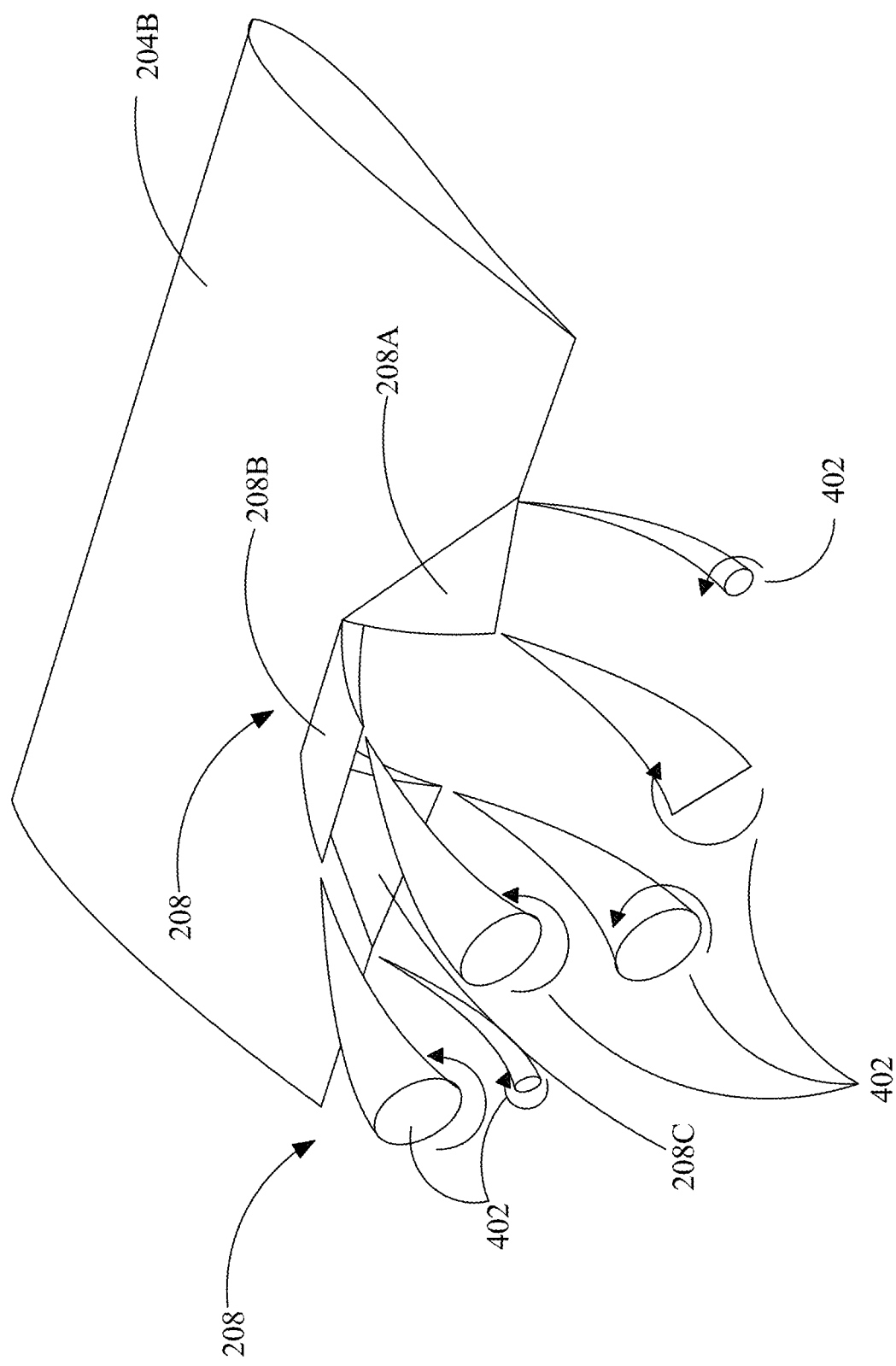
FIG. 5B is a rear-view illustration of a set of angular surfaces in an alternative split configuration, according to some examples disclosed herein.

FIG. 5B is a rear-view illustration of a set of angular surfaces in an alternative split configuration, according to some examples disclosed herein. Illustrated in FIG. 5B is the starboard outer control surface triplet 208 having the individually controllable control surfaces 208A, 208B, and 208C installed on the starboard wing 204B of the fuselage 202. In some examples, one or more of the control surfaces may be used to slow the airplane or to retard the flow of air at a particular location. In this example, the individually controllable control surfaces 208A, 208B, and 208C, by way of example, may be individually movable to create a desired airflow pattern. In this alternative split configuration illustrated in FIG. 5B, the individually controllable control surface 208B is in an upward configuration and the individually controllable control surfaces 208A and 208C are in a downward configuration. This configuration creates vortexes 502.

While several possible embodiments are disclosed above, embodiments of the present invention are not so limited. For instance, while several possible configurations of hydraulic cylinders, linear actuators, valves, and motors, other suitable actuators and controls could be selected without departing from the spirit of embodiments of the invention. In addition, the location and configuration used for various features of embodiments of the present disclosure can be varied according to a particular aircraft, airport, or landing gear design that requires a slight variation due to, for example, size or weight constraints, runway length, aircraft type, or other factors. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. An airplane comprising:
   a blended wing body, wherein the blended wing body comprises:
   a fuselage;
   a port wing and a starboard wing continuously coupled to the fuselage and a nose section;
   a midship control surface disposed on a trailing edge of the blended wing body and centered between the port wing and the starboard wing; and
   at least a first control surface triplet comprising at least a triangular shaped control surface coupled to a rectangular shaped control surface having an interface angle;
   wherein each control surface of the first control surface triplet rotates about an axis that is not parallel to the axes of rotation of the other two control surfaces of the first control surface triplet; and wherein the trailing edge of the first control surface triplet forms a straight line.

2. The airplane of claim 1, wherein the midship control surface comprises an obtuse angle planform.

3. The airplane of claim 1, wherein the midship control surface is movable in an upward direction and downward direction.

4. The airplane of claim 1, wherein the midship control surface may be movable in a split configuration.

5. The airplane of claim 4, wherein the split configuration comprises a top surface of the midship control surface moving in an upward direction and a bottom surface of the midship control surface moving in a downward direction.

6. The airplane of claim 1, wherein the midship control surface includes an edge interface.

7. The airplane of claim 6, wherein the edge interface includes an interface angle ranging from 20 degrees to less than 90 degrees.

8. The airplane of claim 1, wherein the midship control surface comprises an elevon.

9. The airplane of claim 1, wherein the midship control surface comprises an elevator.

10. The airplane of claim 1, wherein the midship control surface is configured to perform air braking.

11. The airplane of claim 1, wherein the first control surface triplet is located on the port wing, and wherein the midship control surface is moved coincidently with the first control surface.

12. The airplane of claim 11, wherein the first control surface triplet comprises three discrete control surfaces, a first control surface, a second control surface, and a third control surface, and wherein the first control surface has a first triangular planform.

13. The airplane of claim 12, wherein the first control surface, the second control surface, or the third control surface are movable in an upward direction or a downward direction.

14. The airplane of claim 12, wherein the first control surface, the second control surface, or the third control surface are individually controllable.

15. The airplane of claim 12, wherein the first triangular planform includes:
    a first edge coincident a trailing edge of the port wing;
    a second edge rotatably affixed to the port wing; and
    a third edge proximal the second control surface, wherein both a first inner control surface angle, between the second edge and the third edge, and a first outer control surface angle, between the first edge and the second edge, are within a first range from 1 degree to 89 degrees.

16. The airplane of claim 12, wherein the first control surface triplet comprises an elevon.

17. The airplane of claim 12, wherein the first control surface triplet comprises an aileron.

18. The airplane of claim 11, further comprising:
    a second control surface triplet on the starboard wing, and wherein the midship control surface is moved coincidently with the second control surface.

19. The airplane of claim 11, further comprising a first control surface doublet on the port wing.

20. The airplane of claim 19, wherein the first control surface triplet, the first control surface doublet, and the midship control surface are configured to operate together as an elevon.

* * * * *